United States Patent [19]

Seiger

[11] 4,049,027
[45] Sept. 20, 1977

[54] ACTIVE MATERIAL FOR PRESSED NICKEL ELECTRODES

[75] Inventor: Harvey N. Seiger, Waterford, Conn.

[73] Assignee: Yardney Electric Corporation, Pawcatuck, Conn.

[21] Appl. No.: 717,860

[22] Filed: Aug. 26, 1976

[51] Int. Cl.² .............................................. H01M 4/88
[52] U.S. Cl. ................................ 141/1.1; 252/182.1; 429/223
[58] Field of Search ........................... 141/1.1, 32, 33; 252/182.1; 429/218, 223; 29/623.1

[56] References Cited

U.S. PATENT DOCUMENTS 3,753,782  8/1973  Beccu et al. ...................... 429/223 X
3,941,614  3/1976  Jackovitz et al. ................... 252/182.1

Primary Examiner—Richard E. Aegerter
Assistant Examiner—Frederick R. Schmidt
Attorney, Agent, or Firm—Donald E. Nist

[57] ABSTRACT

An improved active electrode material for use in pressed nickel electrodes is made by first chemically co-oxidizing nickel and cobalt salts in an aqueous alkaline medium to form the respective $NiO_x$ and $CoO_x$ compounds and thereafter co-precipitating the latter compounds. After the co-precipitated $NiO_x$ and $CoO_x$ compounds are recovered, they are combined with a binder (and other electrode constituents if desired) and pressed into an apertured current collector at elevated pressures to form the pressed nickel electrodes.

15 Claims, 1 Drawing Figure

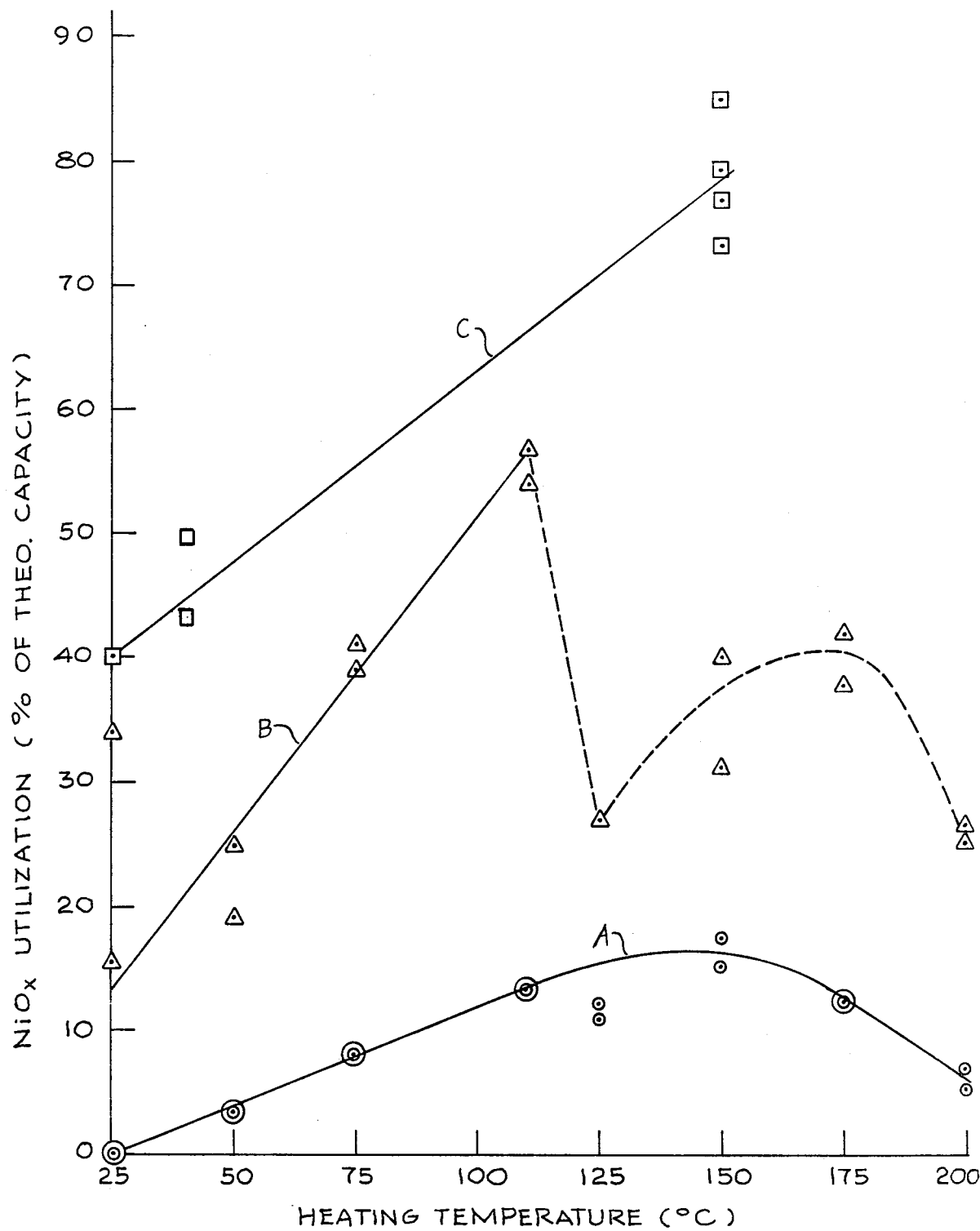

ACTIVE MATERIAL FOR PRESSED NICKEL ELECTRODES

BACKGROUND OF THE INVENTION

Nickel electrodes are utilized in a number of electrochemical cells and batteries including nickel/zinc, nickel/hydrogen, nickel/iron and nickel/cadmium batteries. Such nickel electrodes may be formed in a variety of ways. One particularly useful and relatively inexpensive nickel electrode is the pressed nickel electrode which is made by pressing a mixture of active electrode material and binder into the openings in an apertured lightweight current collector.

The principal active electrode material may be nickel hydroxide or it may be $NiO_x$ which is a berthollide, i.e., $x$ is not an integer. The $NiO_x$ is prepared by chemically oxidizing a nickelous compound such as nickel nitrate by reacting the latter with an oxidizing agent such as sodium hypochlorite in an alkaline medium. Analysis of the $NiO_x$ indicates that it has a nickel content of about 55% by weight and that the value of $x$ is between about 1.65 and 1.8. Analysis also indicates that the $NiO_x$ probably includes some water of hydration.

It has been known that the charge acceptance of the aforementioned pressed nickel electrodes is improved by incorporating a cobalt-containing compound such as cobalt hydroxide in the active electrode material mixture. This is done by simply mixing the nickel-containing and cobalt-containing compounds together with the binder and pressing the resulting mixture into a current collector.

While these prior art pressed nickel electrodes generally exhibit good electrical characteristics, they have to be subjected to a number of charge/discharge cycles in order to obtain good charge acceptance, i.e., they have to be "formed" before using.

SUMMARY OF THE INVENTION

This invention is embodied in a pressed nickel electrode in which a uniquely formed active electrode material mixture is pressed into an apertured current collector. The active electrode material mixture is made by combining a binder with a mixture of $NiO_x$ and $CoO_x$, which mixture is made by chemically co-oxidizing nickel-containing and cobalt-containing salts and co-precipitating the resulting $NiO_x$ and $CoO_x$ from the same solution in which they are produced as oxides. That solution is a lithium-containing alkaline solution.

Pressed nickel electrodes containing the co-oxidized and co-precipitated $NiO_x$ and $CoO_x$, made as described herein, provide substantially better charge acceptance than do pressed nickel electrodes containing either nickel hydroxide and cobalt hydroxide, $NiO_x$ and cobalt hydroxide, or $NiO_x$ and $CoO_x$ which have not been co-precipitated. In fact, the herein-described nickel electrodes do not have to be formed, i.e., repeatedly cycled, prior to use. Instead, they can be simply charged and used.

DESCRIPTION OF THE DRAWING

The FIGURE is a plot of $NiO_x$ Utilization vs. Heating Temperature and graphically illustrates the improvement in pressed nickel electrodes obtained by incorporating therein $NiO_x$ and $CoO_x$ co-precipitated from the same solution in which they are formed.

DESCRIPTION OF THE PREFERRED EMBODIMENT

The pressed nickel electrode described herein is made by pressing an active electrode material admixture into the openings in an apertured lightweight current collector. The active electrode material admixture comprises at least the active electrode material and a binder to bind the latter to the current collector at the pressures employed to fabricate the electrode. Other components such as conductive diluents and pore formers may also be included in the admixture.

The active electrode material is a lithium-containing co-precipitation product of the chemical co-oxidation of nickelous and cobaltous salts and, more specifically, is a lithium-containing, relatively uniform dispersion of $CoO_x$ in $NiO_x$. The particular chemical co-oxidation and co-precipitation steps employed in the formation of the herein-described active electrode material serve to give pressed nickel electrodes made from it superior initial performance characteristics.

The general method of separately forming $NiO_x$ and of forming $CoO_x$ from their respective salts by chemical means is well known and is used herein. However, as a departure from the prior art, the $NiO_x$ and $CoO_x$ of this invention are formed by co-oxidation of their respective salts, and are co-precipitated and recovered as the co-precipitate from the same alkaline solution in which they are produced as oxides. Furthermore, the alkaline solution is limited to those containing lithium.

More specifically, the $NiO_x$ and $CoO_x$ are prepared by chemically co-oxidizing nickelous and cobaltous salts by reacting those salts with an oxidizing agent in an alkaline medium. The nickel and cobalt salts which may be utilized are those which permit solubilization of the nickel and cobalt ions and which produce anions which are not corrosive in the precipitation environment. Nickelous and cobaltous salts which may be employed herein include nickel and cobalt nitrates, sulfates, chlorides, carbonates and perchlorates.

Chemical oxidation of the nickel and cobalt salts can be accomplished using many different oxidizing agents. Useful oxidizing agents include, but are not limited to, sodium hypochlorite, potassium hypochlorite, bromine, and the bromate and bromite salts of sodium and potassium.

The alkaline medium is an aqueous solution of lithium hydroxide or mixture of lithium hydroxide with other strong bases. It is presently preferred to employ an aqueous solution of sodium hydroxide and lithium hydroxide. However, other strong bases such as potassium hydroxide, bismuth hydroxide, and vanadium hydroxide can also be used in combination with the lithium hydroxide. The latter is preferably used in an amount of about 1% by wt. per 100 gm. of alkaline medium although amounts up to the lithium hydroxide solubility limit (about 2% by wt./100 gm. of alkaline medium at normal ambient conditions) can be utilized.

To prepare the $NiO_x$ and $CoO_x$, a nickelous/cobaltous salt solution is first made up. This may be done by making up separate solutions of each of these salts and then combining them before the chemical oxidation step, or a single solution of the nickelous and cobaltous salts may be made initially. These solutions are made by dissolving the nickelous and cobaltous salts in water, preferably distilled or deionized water, to provide the desired nickelous and cobaltous salt concentrations. Similarly, the base and oxidant components are dissolved together in water to form an alkaline oxidant solution.

The nickelous salt concentration in the nickelous/cobaltous salt solution is adjusted so that it will preferably be present in a 0.17 to 2 molar concentration in the combined salt/oxidant solution (nickelous/cobaltous salt solution plus the oxidant/base solution).

The ratio of nickel to cobalt in the nickelous/cobaltous salt solution can vary considerably as is well known. However, it is presently preferred to utilize the nickelous and cobaltous salts in concentrations such that the resulting nickel:cobalt ratio is between about 9:1 to 9.8:0.2, respectively.

The base component concentration in the oxidant/base solution is adjusted so that it is preferably present in the combined salt/oxidant solution in a concentration range of about 2 to 6.5 molar. Likewise, the oxidant component concentration is adjusted so that it is preferably present in a concentration range in the salt/oxidant solution of about 0.34 to about 1 molar.

Particular concentrations of the nickelous salt, oxidant and base components are employed within the previously disclosed concentration ranges for these components such that the molar ratio of the nickelous salt to oxidant is preferably about 1:2 to about 1:8 and so that the molar ratio of the nickelous salt to base is about 1:2 to about 1:15. The amount of cobaltous salt will, of course, vary within the range required to provide the aforementioned ratio of nickel to cobalt.

After the nickelous/cobaltous salt and the oxidant/base solutions have been made up, they are combined to provide the reactive salt/oxidant solution. Preferably, this is done by combining the aforementioned two solutions in a volume ratio of one volume of the nickelous/cobaltous salt solution to three volumes of the oxidant/base solution. The addition of these two solutions to each other is preferably made by adding the nickelous/cobaltous salt solution slowly with stirring to the oxidant/base solution. The resulting lithium-containing $NiO_x/CoO_x$ black precipitate is then collected, washed and dried at approximately 40°–50° C.

To fabricate a pressed nickel electrode, the recovered and dried $NiO_x/CoO_x$ co-precipitate is combined with a suitable binder such as polytetrafluoroethylene or a latex stable under the working conditions. Other constituents such as agents to improve internal conductivity, e.g., graphite, may also be included in the active electrode material/binder admixture. The latter is pressed into the openings in an apertured current collector so that the latter essentially becomes encased in a matrix of the active electrode material/binder admixture. The current collector may simply be an apertured flat nickel sheet, or it may be an expanded nickel sheet. The pressures employed to press the active electrode material/binder admixture into the current collector are such that the materials present (expressed as nickel hydroxide) are compacted to a density no greater than 2 gm/cm³.

This invention will be further described by the following Example.

EXAMPLE

Two sets of nickel/cobalt electrodes were made as follows. The first set was made from a mix having the following composition: 81 wt.% $NiO_x$, 7 wt.% Co(OH)$_2$, 5 wt.% graphite, 5 wt.% nickel flake, 2 wt.% polytetrafluoroethylene. The second set was made from a mix having the following composition: 79 wt.% $NiO_x$, 9 wt.% $CoO_x$, 5 wt.% graphite, 5 wt.% nickel flake, 2 wt.% polytetrafluoroethylene. For the latter set of electrodes, the $NiO_x$ and $CoO_x$ were co-precipitated from an aqueous LiOH (0.49 molar)/NaOH (2.5 molar) solution initially containing nickel nitrate (1.4 molar) and cobalt nitrate (0.16 molar), together with sodium hypochlorite (1 molar). In each case, the mix was applied to an expanded metal current collector and was pressed at approximately 12,000 psi to make a finished electrode.

Prior to assembly into a cell, the finished electrodes were put into an oven and were held at a prescribed temperature for 2 hours. Some electrodes were heated at 50° C., others at 75° C., etc., on up to 200° C as shown in the FIGURE. After the heat treatment, the electrodes were cooled to room temperature, were assembled into individual cells utilizing nickel plaque counter electrodes and aqueous NaOH/LiOH electrolyte and then were cycled (discharged/charged).

Because the $NiO_x$, and to a much lesser extent the cobalt-containing constituents, have some intrinsic electrochemical capacity, the cells were first discharged to 0.55 volts measured against a cadmium reference prior to being charged electrochemically.

The discharge capacity of the chemically oxidized $NiO_x/Co(OH)_2$ and $NiO_x/CoO_x$ during this initial discharge is given in the FIGURE (Curve A) along with the discharge capacity of the electrochemically oxidized $NiO_x/Co(OH)_2$ and $NiO_x/CoO_x$ electrodes (Curves B and C, respectively) after the first electrochemical charging of the cells.

At any given temperature represented in the FIGURE, it will be noted that an improvement in $NiO_x$ utilization is obtained from both the electrochemically-charged $NiO_x/Co(OH)_2$ and $NiO_x/CoO_x$ electrodes as compared to the chemically-charged $NiO_x/Co(OH)_2$ and $NiO_x/CoO_x$ electrodes (Curve A which appears as a single curve because of the similarity in values of the chemically-charged electrodes). However, again at any selected temperature, the $NiO_x$ utilization is significantly higher for electrochemically-charged electrodes which include co-precipitated $NiO_x$ and $CoO_x$ (Curve C) as compared to the electrochemically-charged electrodes which include nickel and cobalt oxides which have not been co-precipitated (Curve B). In this connection, it is to be noted that the foregoing comparison is valid since the Co(OH)$_2$ constituent is changed to its oxidized form when subjected to electrochemical charging.

I claim:

1. A method of making an active electrode material admixture comprising the berthollides $NiO_x$ and $CoO_x$ where $x$ is not an integer, said method comprising the steps of:

preparing a nickelous/cobaltous salt solution for addition to an oxidant/base solution to produce a salt/oxidant solution, by dissolving at least one nickelous salt and at least one cobaltous salt in water to provide a nickelous salt concentration in said salt/oxidant solution between about 0.17 molar and about 2 molar and a ratio of nickel to cobalt between about 9:1 and about 9.8:0.2;

preparing said oxidant/base solution by dissolving lithium hydroxide and an oxidizing agent in water to provide concentrations of said lithium hydroxide and oxidizing agent in said salt/oxidant solution between about 2 molar and about 6.5 molar and between about 0.34 molar and about 1 molar, respectively;

slowly adding said nickelous/cobaltous salt solution with stirring to said oxidant/base solution to produce said salt/oxidant solution, whereby said $NiO_x$ and $CoO_x$ are formed in said salt/oxidant solution and co-precipitated therefrom as a lithium-containing black precipitate; and recovering the lithium-containing $NiO_x/CoO_x$ co-precipitate from said salt/oxidant solution.

2. The method of claim 1 in which said oxidant/base solution additionally includes a strong base material selected from the group consisting of sodium hydroxide, potassium hydroxide, bismuth hydroxide, and vanadium hydroxide and the total concentration of said strong base material, including said lithium hydroxide, in said salt/oxidant solution is between about said 2 molar and said 6.5 molar.

3. The method of claim 2 wherein the molar ratio of said nickelous salt to said oxidizing agent and to said base material is between about 1:2 and about 1:8 and between about 1:2 and about 1:15, respectively.

4. The method of claim 1 wherein said water is distilled or deionized water.

5. The method of claim 1 wherein said nickelous and cobaltous salts are materials selected from the group consisting of nickelous and cobaltous nitrates, sulphates, carbonates, perchlorates and chlorides.

6. The method of claim 1 wherein said oxidizing agent is a material selected from the group consisting of bromine and sodium and potassium hypochlorites, bromates and bromites.

7. A method of forming a pressed nickel electrode comprising the method of claim 1 and the additional steps of:

drying said $NiO_x/CoO_x$ co-precipitate;

admixing said dried $NiO_x/CoO_x$ co-precipitate with a binder; and pressing said $NiO_x/CoO_x$ co-precipitate and binder admixture into an apertured current collector.

8. A pressed nickel electrode made according to the method of claim 7.

9. The $NiO_x/CoO_x$ co-precipitate made according to the method of claim 1.

10. A method of making an active electrode material comprising the berthollides $NiO_x$ and $CoO_x$ where $x$ is not an integer, said method comprising the steps of:

preparing a nickelous/cobaltous salt solution for addition to an oxidant/base solution to produce a salt/oxidant solution, said nickelous/cobaltous salt solution being made by dissolving at least one nickelous salt and at least one cobaltous salt in water to provide a nickelous salt concentration in said salt/oxidant solution between about 0.17 molar and about 2 molar and a ratio of nickel to cobalt between about 9:1 and about 9.8:0.2; said nickelous and cobaltous salts being materials selected from the group consisting of nickelous and cobaltous nitrates, carbonates, chlorides, sulphates and perchlorates;

preparing said oxidant/base solution by dissolving a strong base and an oxidizing agent in water to provide concentrations of said strong base and said oxidizing agent in said salt/oxidant solution between about 2 molar and about 6.5 molar and between about 0.34 molar and about 1 molar, respectively, said strong base being lithium hydroxide or lithium hydroxide in combination with at least one member of the group consisting of sodium hydroxide, potassium hydroxide, bismuth hydroxide and vanadium hydroxide;

slowly adding said nickelous/cobaltous salt solution with stirring to said oxidant/base solution to produce said salt/oxidant solution, whereby said $NiO_x$ and $CoO_x$ are formed in said salt/oxidant solution and co-precipitate therefrom as a lithium-containing black precipitate; and recovering the lithium-containing $NiO_x/CoO_x$ co-precipitate from said salt/oxidant solution.

11. The method of claim 10 wherein said oxidizing agent is a material selected from the group consisting of bromine and sodium and potassium hypochlorites, bromates and bromites.

12. The method of claim 11 wherein said water is distilled or deionized water.

13. A method of forming a pressed nickel electrode comprising the method of claim 10 and the additional steps of:

drying said $NiO_x/CoO_x$ co-precipitate;

admixing said dried $NiO_x/CoO_x$ co-precipitate with a binder; and pressing said $NiO_x/CoO_x$ co-precipitate and binder admixture into an apertured current collector.

14. A pressed nickel electrode made according to the method of claim 13.

15. The $NiO_x/CoO_x$ co-precipitate made according to the method of claim 10.

* * * * *